Aug. 6, 1968  HIN HUNG HO ET AL  3,396,333
ODOMETER SYSTEM FOR VEHICLES EMPLOYING A FREQUENCY DIVIDER
Filed April 13, 1965  4 Sheets-Sheet 1
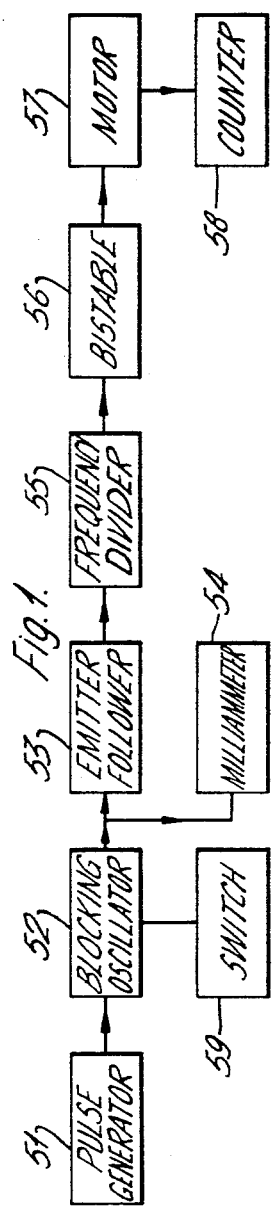
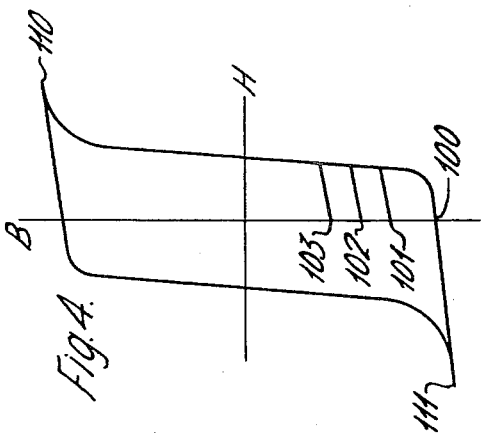
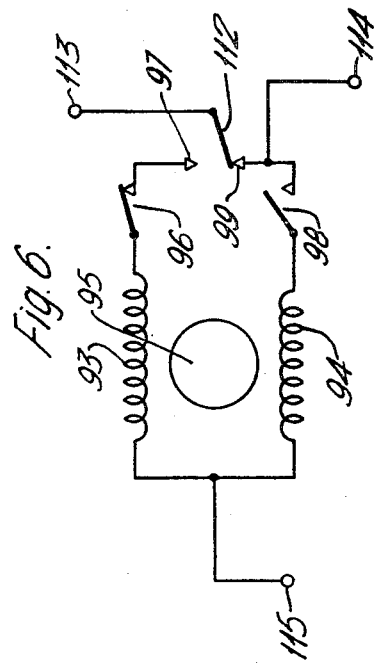
Inventors:
Hin Hung Ho
John Alexandre Sherrington
James Bernard Vousden
Attorneys: Hall, Pollock + Vande Sande

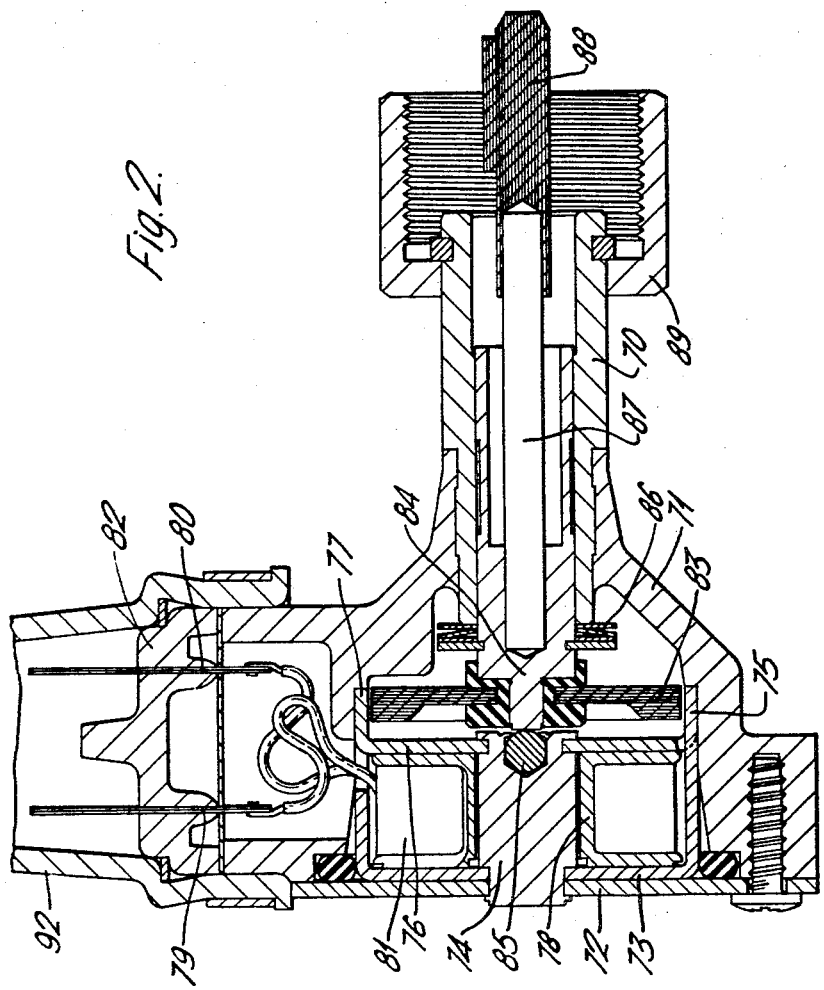

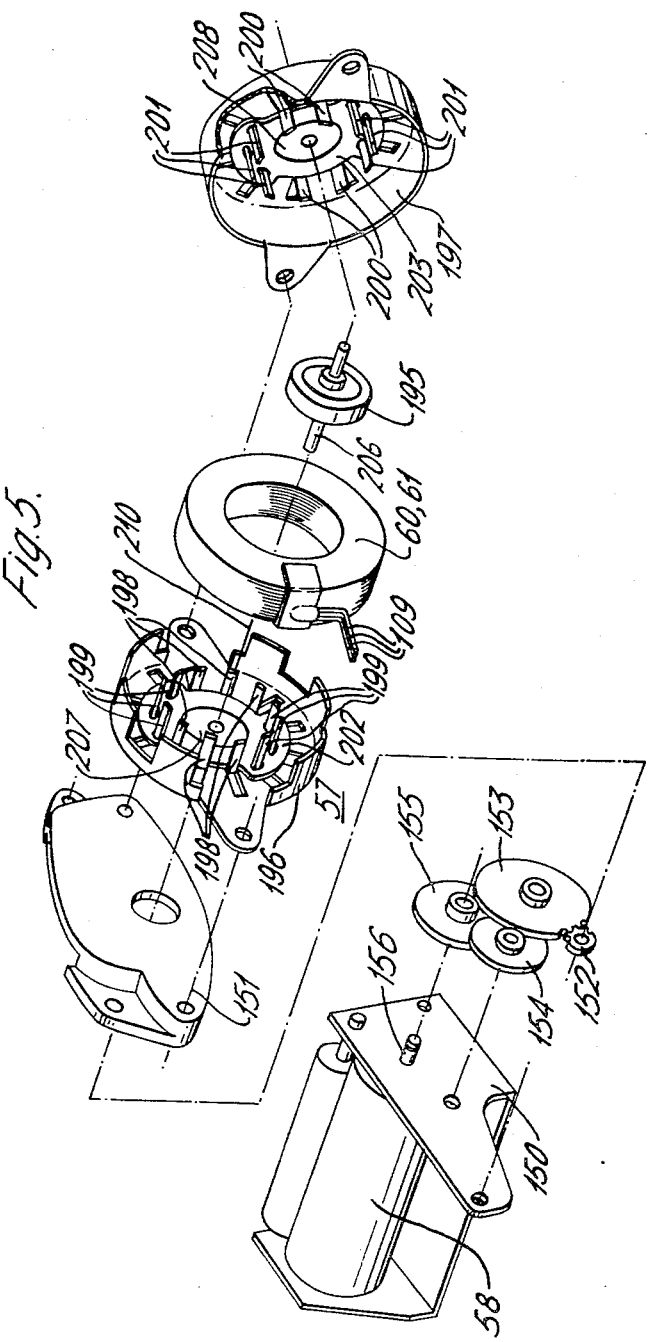

United States Patent Office 3,396,333
Patented Aug. 6, 1968

3,396,333
ODOMETER SYSTEM FOR VEHICLES EMPLOYING A FREQUENCY DIVIDER
Hin Hung Ho, Kowloon, Hong Kong, and John Alexandre Sherrington, Godalming, and James Bernard Vousden, St. Albans, England, assignors to S. Smith & Sons (England) Limited, London, England, a British company
Filed Apr. 13, 1965, Ser. No. 447,703
Claims priority, application Great Britain, Apr. 13, 1964, 15,232/64
12 Claims. (Cl. 324—70)

ABSTRACT OF THE DISCLOSURE

The disclosure relates to a combined vehicle odometer and speedometer having a pulse generator which produces pulses at a frequency proportional to the vehicle speed. The pulses are shaped and are then passed through a frequency divider and a drive circuit to a counter driven by a stepping motor and calibrated in units of distance. The shaped pulses are also passed to a current meter calibrated in units of speed.

---

According to this invention there is provided an odometer for a vehicle comprising generator means for generating a train of pulses at a rate proportional to the speed of the vehicle, pulse shaping means to which the pulses are applied and which produce a shaped pulse in response to each applied pulse, the energy of each shaped pulse being similar, frequency dividing means comprising a magnetic core having a winding to which the shaped pulses are applied, and sensing means for sensing the condition that the magnetic core is saturated with the flux in one direction and a current is passing through the winding in the sense to increase the flux in the said one direction, the shaped pulses being arranged to increase the flux incrementally in the said one direction, the sensing means being arranged to cause a current pulse to flow through the said winding or a further winding when the said condition is sensed, the current pulse being such that the magnetic core is saturated with the flux in the opposite direction to the said one direction, and counting means for counting the current pulses and for displaying the count in units of distance.

In use, if the number of shaped pulses required to saturate the magnetic core with the flux in the said one direction when the magnetic core is initially saturated with the flux in the opposite direction to the said one direction is $n$, then the rate at which current pulses pass through the winding or the further winding is the rate at which shaped pulses pass through the winding divided by $n$. The integer $n$ is constant as the energy of each shaped pulse is the same.

Preferably the sensing means comprise amplitude responsive means connected to the said winding and arranged to cause a current pulse to flow through a further winding when the current flowing through the said winding exceeds a predetermined value.

Preferably the pulse shaping means comprise a monostable blocking oscillator comprising a transistor and a transformer having a magnetic core wound with first and second windings, the first winding being connected in the input circuit of the blocking oscillator and the second winding being connected in the output circuit of the blocking oscillator, the arrangement being such that in response to each applied pulse, a current pulse passes through the second winding, the magnetic core being saturated during the said current pulse.

Preferably the magnetic core of the frequency dividing means is of the same material as that of the magnetic core of the monostable blocking oscillator.

In a preferred arrangement, the counting means comprises a stepping motor, a drive circuit for the stepping motor to which the current pulses are applied and a counter driven by the stepping motor.

Preferably the stepping motor comprises first and second stator members each formed of a high permeability magnetic material and provided with a plurality of poles, the stator members being disposed so that the poles interdigitate, first and second windings associated with both the first and the second stator members, a permanently magnetised rotor, and means for ensuring the rotor is confined to a single direction of rotation, the drive circuit being arranged to energise the first and second windings alternately in response to successive current pulses.

Preferably the means for ensuring the rotor is confined to a single direction of rotation comprise means shading some of the poles of the first and second stator members.

Preferably the drive circuit comprises a bistable trigger circuit having first and second stable states, the bistable circuit being such that current flows through a first path in its first stable state and through a second path in its second stable state, the first winding of the motor being connected in the first path and the second winding being connected in the second path.

Preferably control means are associated with the pulse shaping means for altering the energy in the shaped pulses.

According to a feature of this invention, there is provided a combined odometer and speedometer for a vehicle comprising an odometer as has been set forth and a current meter to which the shaped pulses are applied.

The combined odometer and speedometer for a vehicle in accordance with this invention will now be described with reference to the accompanying drawings of which:

FIGURE 1 is a block diagram of the combined odometer and speedometer.

FIGURE 2 is a sectional elevation of an A.C. generator.

FIGURE 4 is a graph showing the B–H curve of a magnetic core.

FIGURE 5 is a perspective exploded view of a motor and a counter.

FIGURE 6 is a circuit diagram of an electrically operated overdrive.

Figure 3:
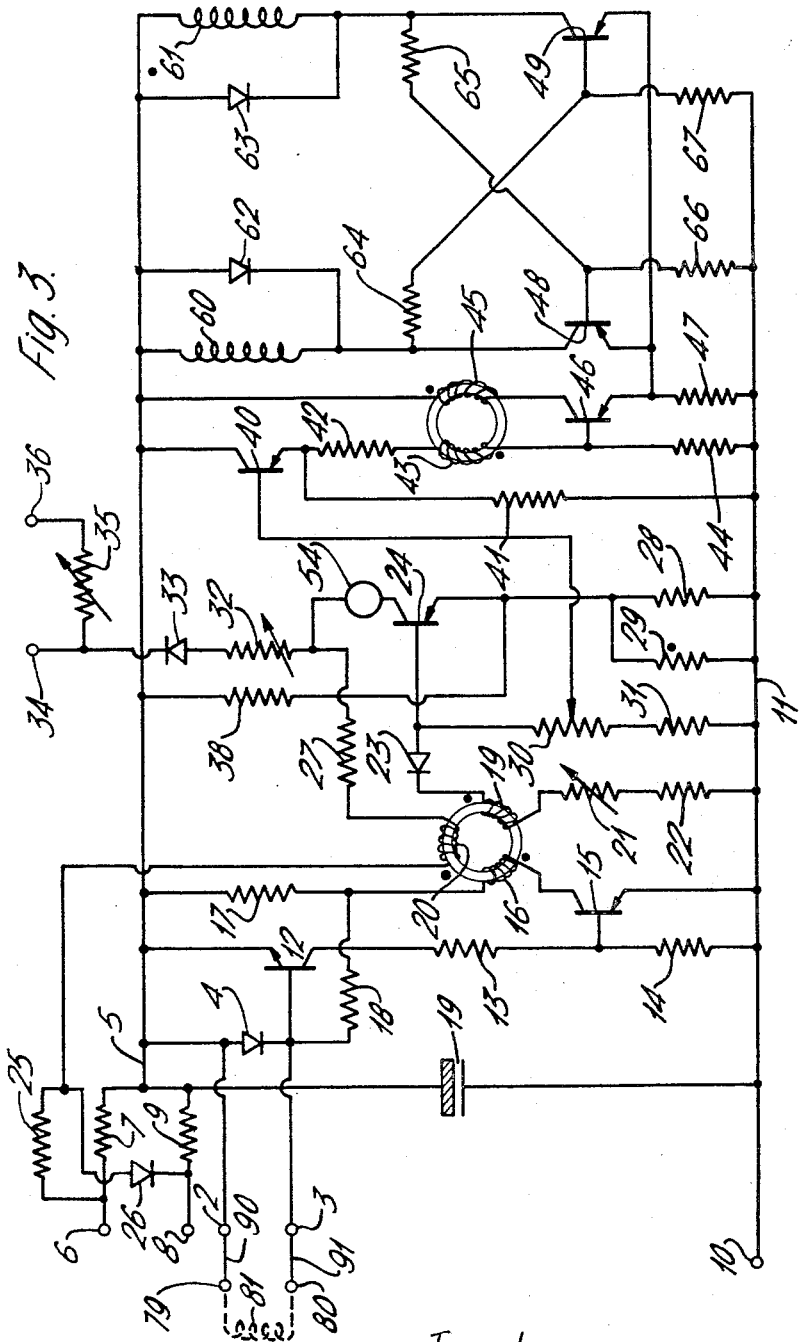
FIGURE 3 is a circuit diagram of the combined odometer and speedometer.

Referring first to FIGURE 1, pulses are generated by a pulse generator 51 at a rate proportional to the speed of rotation of a shaft which drives the vehicle wheels. The pulses generated by the pulse generator 51 are applied to a monostable blocking oscillator 52 which, in response to each applied pulse, applies a current pulse to a milliammeter 54 calibrated in units of speed and to an emitter follower 53. The blocking oscillator 52 is controlled by a switch 59, the energy content of the current pulses it applies to the milliammeter 54 and the emitter follower 53 being dependent on the setting of the switch 59. For a given setting of the switch 59, the current pulses applied to the meter 54 have the same energy content, that is the product of current and time remains constant, whatever the shape of the pulse genrated by the generator 51. Similarly the enegy content of all the pulses applied to the emitter follower 53 is the same. The output pulses of the emitter follower 53 are applied to a frequency divider 55 which produces one output pulse for a number of input pulses and may conveniently produce one output pulse for every eleven input pulses. The output pulses of the frequency divider 55 trigger a bistable 56 which drives a motor 57 which in turn drives a conventional drum counter 58.

The pulse generator 51 has an A.C. generator shown in FIGURE 2 which is similar in configuration to a synchronous electric motor for clocks such as that shown in British Patent No. 934,956. The A.C. generator has a casing made up of cast members 70 and 71 and an end plate 72. A cup-shaped stator member 73 of a high permeability magnetic material has its base held against the plate 72 by the spun-over end of a cylindrical core 74 of a high permeability magnetic material. The rim 75 of the stator member 73 is cut away to form fifteen magnetic poles. The other end of the core 74 is spun over a hole in the base of a shallow cup-shaped member 76 of a high permeability magnetic material. The rim 77 of the stator 76 is cut away to form fifteen poles which interdigitate with those of the stator members 73. The core 74 carries between the bases of the stator members 73 and 76, a bobbin 78 on which is wound a winding 81. The ends of winding 81 are soldered to two blade connectors 79 and 80 held by an insulating member 82. A permanently magnetised ferrite rotor 83 is disc shaped and has fifteen pairs of poles around its periphery. The rotor 83 is carried by a stem 84 in the plane of the poles of the stator members 73 and 76 for rotation about the axis of the members 73 and 76. The stem 84 is force fitted onto one end of a flexible core 87 and is urged against a ball 85 carried by the end of the core 74 by a spring washer 86. The other end of the core 87 is force fitted into a key 88 which is shaped to be fitted into a socket formed in a member driven by the output shaft of the gear box of the vehicle. A nut 89 is provided to secure the A.C. generator to the conventional threaded spigot projecting from the gear box. In use, when the key 88 and therefore the rotor 83 are driven at a speed proportional to that of the output member of the gear box, an A.C. signal is induced in the winding 81 at a frequency set by the rotational speed of the rotor 83. The A.C. signal has a waveform which is almost a pure sine wave.

Referring now to FIGURE 3, the combined odometer and speedometer is designed for use on a vehicle having either a twelve volts battery or a twenty four volts battery. The terminals 79 and 80 are connected to terminals 2 and 3 respectively by leads 90 and 91 respectively across which a diode 4 is connected. The leads 90 and 91 are protected by a rubber tube 92 (FIGURE 2).

The circuit has a negative supply line 5 connected to a terminal 6 through a resistor 7 and to a terminal 8 through a resistor 9. If the vehicle has a twenty four volts battery the terminal 6 is connected to the negative terminal of the vehicle battery and the terminal 8 is left unconnected whereas if the vehicle has a twelve volts battery the terminal 8 is connected to the negative terminal of the vehicle battery and the terminal 6 is left unconnected. The circuit has a positive supply line 11 connected to a terminal 10 connected to the positive terminal of the vehicle battery. A capacitor 19 is connected between the lines 5 and 11. The terminal 2 is connected to the line 5 and the terminal 3 is connected to the base of an n-p-n silicon transistor 12. The collector of the transistor 12 is connected through two resistors 13 and 14 to the line 11 and its emitter is connected to the line 5. The base of a p-n-p germanium transistor 15 is connected to the junction of the resistors 13 and 14 and the emitter of the transistor 15 is connected to the line 11. The collector of the transistor 15 is connected through a winding 16 and a resistor 17 to the line 5. The junction of the winding 16 and the resistor 17 is connected through a resistor 18 to the base of the transistor 12.

The transistors 12 and 15 are both biased "OFF" during the half-cycles the terminal 2 is at a more positive potential than the terminal 3 and both become fully switched "ON" during the half cycles the terminal 2 is at a more negative potential than the terminal 3. The resistor 18 provides a positive feedback signal from the collector of the transistor 15 to the base of the transistor 12 and ensures that the transistor 15 is switched "ON" very rapidly. The diode 4 serves to protect the transistor 12.

The winding 16 is wound on a toroidal core of a square loop material which has two further windings 19 and 20. One end of the winding 19 is connected through a variable resistor 21 and a resistor 22 to the line 11. The other end of the winding 19 is connected through a diode 23 to the base of a germanium p-n-p transistor 24. The collector of the transistor 24 is connected through the milliammeter 54, a resistor 27, the winding 20 and a resistor 25 to the terminal 6, the junction of the winding 20 and the resistor 25 being connected to the terminal 8 through a diode 26. The emitter of the transistor 24 is connected to the line 11 through a resistor 28 and a thermistor 29 (a resistor with a large negative coefficient of change of resistance with temperature) in parallel, and to the line 5 through a resistor 38. The base of the transistor 24 is connected to the line 11 through a potentiometric resistor 30 and a resistor 31 in series. The transistor 24 and its associated components form the monostable blocking oscillator 52. The blocking oscillator operates in the following manner. It will be assumed that a current pulse has just passed through the winding 20 of sufficient magnitude to saturate the core with the flux in one direction and that no current is flowing through any of the windings 16, 19 and 20. The flux in the core will thus be the remanent flux. When current flows through the winding 16, the direction of the flux in the core is reversed and the core is saturated. The E.M.F. induced in the winding 19 during the period current flows in the winding 16 is in the sense to bias the transistor 24 "OFF." When the current flowing through the winding 16 ends the flux in the core begins to fall thereby inducing an E.M.F. in the winding 19 in the sense to bias the transistor 24 "ON." Current then flows through the winding 20 and the milliammeter 54, the current through the winding 20 being in the sense to reverse the direction of the flux (i.e., to bring the direction of the flux to that originally referred to) and augments the E.M.F. induced in the winding 19. The transistor 24 is therefore rapidly switched "ON." The current through the winding 20 ceases to increase when the magnetic core saturates so the magnitude of the E.M.F. induced across the winding 19 falls. The current through the milliammeter 54 and the winding 20 falls and a reverse E.M.F. is induced in the winding 19 so that the transistor 24 is rapidly switched "OFF." Remanent flux remains in the core which is in the condition originally referred to. On each occasion the blocking oscillator 52 is triggered, a current pulse having a substantially constant energy content passes through the milliammeter 54. The diode 23 protects the transistor 24 against the large reverse E.M.F. which is induced in the winding 19 when the transistor 15 is switched "OFF." The junction of the milliammeter 54 and the resistor 27 is connected through a variable resistor 32 and a diode 33 to a terminal 34 which is connected through a resistor 35 to a terminal 36. The function of the components 32 to 36 which form part of the switch 59 will be described later.

The wiper of the potentiometric resistor 30 is connected to the base of a germanium p-n-p transistor 40, the collector of which is connected to the line 5. The emitter of the transistor 40 is connected to the line 11 through a resistor 41 and through a resistor 42, a winding 43 and a resistor 44 in parallel. The transistor 40 and its associated components form the emitter follower 53. On each occasion the blocking oscillator 52 is triggered a current pulse passes through the winding 43, the energy content of the current pulses being substantially constant. The winding 43 is wound on a toroidal magnetic core which has a further winding 45. The base of a germanium p-n-p transistor 46 is connected to the junction of the winding 43 and the resistor 44 and its collector is connected to the line 5 through the winding 45. The emitter of the transistor 46 is connected to the line 11 through a resistor 47. The windings 43 and 45, the core on which they are wound and the associated components from the frequency divider 55.

The operation of the frequency divider 55 will now be described, reference being made to FIGURE 4 which is a graph of flux density against field strength for the core on which the windings 43 and 45 are wound. In the quiescent state the transistor 46 is biased "OFF" by the resistor 44. Assuming that current has just flowed through the winding 45 but no current is flowing in either winding, the flux level in the core corresponds to the point 100 in FIGURE 4. When the blocking oscillator 53 is triggered, a pluse of current passes through the winding 43 reducing the flux in the core until it is that corresponding to the point 101 in FIGURE 4. The incremental reluctance of the core during the pulse of current which increases the flux level from that corresponding to the point 100 to that corresponding to the point 101 is comparatively small so that the winding 43 has a comparatively high inductance and impedance. The magnitude of the current is therefore comparatively small and the potential difference icross the resistor 44 is insufficient to cause the transistor 46 to conduct. The next pulse of current in the winding 43 reduces the flux level in the core until it corresponds to the point 102 but no current flows through the transistor 46. The next pulse of current through the winding 43 brings the flux level to the point 103. Succeeding pulses of current through the winding 43 reduce the flux to zero and then increase it in the opposite sense, but until the core is saturated no current flows through the transistor 46. Eventually a pulse of current flows through the winding 43 which saturates the core and increases the flux level to that corresponding to the point 110 of FIGURE 4. The incremental reluctance during this pulse is comparatively large so that the inductance and impedance of the winding 43 are compartively small. The current then flowing in the winding 43 gives rise to a potential difference across the resistor 44 sufficient to cause the transistor 46 to conduct. Current then flows through the winding 45, the magnitude and sense of which is such to reverse the sense of the flux in the core and then to increase the flux until the core is saturated (i.e., the flux level corresponds to the point 111). When the current ceases in the winding 45, the flux level of the core corresponds to the point 100. It will be seen that rate of the pulses in the winding 45 is that of the rate of the pulses in the winding 43 divided by the number of pulses passing through the winding 43 required to bring the core from saturation with the flux in one direction to saturation with the flux in the other direction. As the energy content of each pulse passing through the winding 43 is the same, the factor of division of the frequency divider 55 remains constant.

The cores on which the windings 16, 19 and 20 and the windings 43 and 45 are wound are similar and consist of tape of a grain orientated square loop magnetic material wound to form an annular core.

The bistable 56 has two germanium p-n-p transistors 48 and 49, the emitters of which are connected to the emitter of the transistor 46. The collectors of the transistors 48 and 49 are connected to the line 5 through the windings 60 and 61 respectively. The windings 60 and 61 are the stator windings of the stepping motor 57 shown in FIGURE 5 and are shunted by diodes 62 and 63 respectively. The collector of transistor 48 is connected through a resistor 64 to the base of transistor 49 while the collector of transistor 49 is connected through a resistor 65 to the base of transistor 48. The bases of transistors 48 and 49 are connected through the resistors 66 and 67 respectively to the line 11.

The bistable 56 is triggered on each occasion a current pulse passes through the transistor 46 and the waveforms of the voltages applied to windings 60 and 61 are square waves in antiphase.

Referring now to FIGURE 5, the motor 57 has a permanently magnetised ferrite rotor 195 having twelve pairs of poles around its periphery. The motor has two generally circular stator members 196 and 197 of a high permeability magnetic material such as mild steel. The stator member 196 has twelve poles pressed out of it, six of which (indicated at 198) are unshaded and six of which (indicated at 199) are shaded by a copper plate 202. The stator member 197 has the poles pressed out of it, four which (indicated at 200) are unshaded and six of which (indicated at 201) are shaded by a copper plate 203. When the members 196 and 197 are fitted together each pole of the member 197 lies between two poles of the member 196 and the poles surround the rotor 195. The rotor 195 is carried by a spindle 206 for rotation about the axis 210 within bearings 207 and 208 secured to the centres of the members 196 and 197 respectively. The winding 60 and 61 surround the poles 198, 199, 200 and 201 and are wound together to form an annular self-supporting structure. One end of the winding 60 is soldered to one end of the winding 61 so that only one lead need be provided for those ends. The annular structure thus has three leads 209. The poles 198 and 199 are not disposed symmetrically about the common axis 210 of the members 196 and 197 nor are the poles 200 and 201 disposed symmetrically about the axis 210 but are disposed in the manner of the poles of the stator members of the motor shown in British Patent No. 876,576 which shows a motor which only differs from the motor 57 in that it has a single winding instead of two windings 60 and 61. The unsymmetrical distribution of the poles 198, 199, 200 and 201 and the shading provided by the plates 202 and 203 serve to make the motor 57 unidirectional and self-starting.

A current pulse through the winding 60 causes flux to pass through the members 196 and 197 in one sense while a current pulse through the winding 61 causes flux to pass through the members 196 and 197, in the opposite sense. The motor 57 thus operates in the same manner as the motor of British Patent No. 876,576 when the winding of that motor is energised from an alternating current source.

The motor 57 drives the counter 58 through a reduction gear train enclosed by the frame 150 of the counter 58 and a cover 151. The cover 151 is attached to the motor 57 and the frame 150. A pinion 152 carried by the spindle 20 meshes with a wheel 153. A pinion (obscured in FIGURE 5) rotatable with the wheel 153 drives a wheel 154. A pinion (obscured in FIGURE 5) rotatable with the wheel 154 drives a wheel 156 secured to the input shaft 157 of the counter 58. The counter 58 is calibrated in units of distance.

The driving wheels of the vehicle are driven through an electrically operated overdrive unit with which the switch 59 is associated. The operation of the combined odometer and speedometer will first be discussed ignoring the overdrive unit and the switch 59.

The overall operation of the combined odometer is as follows. The rate of pulses generated by the pulse generator 51 is proportional to the vehicle speed. Each pulse produced by the blocking oscillator 52 has a similar energy content so that the average current fed to the milliammeter 54 is a measure of the vehicle speed. As previously mentioned the milliammeter is caibrated in units of speed e.g. m.p.h. to give a direct reading of the vehicle speed. The rate of pulses fed to the frequency divider 55 is the same as that produced by the blocking oscillator 52, the emitter follower 53 only serving to isolate the frequency divider 55 from the blocking oscillator 52. The number of pulses produced by the frequency divider 55 is proportional to the distance travelled by the vehicle as is that of the number of pulses produced by the bistable 56. The bistable 56 serves to drive the motor 57 which in turn drives the counter 58. The count of the counter 58 is a measure of the distance the vehicle has travelled.

FIGURE 6 shows the electrical control circuit of the overdrive unit. A reversible motor has an armature 95 and two windings 93 and 94, the direction of rotation of the armature 95 being dependent on which winding is energised. The winding 93 is connected in series with a switch 96 between a terminal 115 (to which the positive terminal of the vehicle battery is connected) and a fixed contact 97 of a changeover switch. The terminal 115 is connected to the postitive terminal of the vehicle battery. The winding 94 is connected in series with a switch 98 between earth and the other fixed contact 99 of the changeover switch. The moveable contact 112 of the changeover switch is operable by the vehicle driver and is connected to a terminal 113 connected to the negative terminal of the vehicle battery. The switches 96 and 98 are operated by the motor in the manner described below. A terminal 114 is connected to the contact 99. If the vehicle has a twenty four volts battery and the terminal 36 is connected to the terminal 114 and the terminal 34 is left unconnected whereas if the vehicle has a twelve volts battery the terminal 34 is connected to the terminal 114 and the terminal 36 is left unconnected.

The motor operates the overdrive mechanism when it rotates. The changeover contact and switches are shown in the positions they take up when the overdrive gives the higher axle ratio. When the moving contact 112 is brought into engagement with the contact 97, the winding 93 is energised and the motor operates the overdrive so that the lower axle ratio is engaged. The motor when the lower axle ratio has been engaged closes the switch 98 and opens the switch 96 de-energising the winding 93. The terminal 114 is then effectively connected to the positive terminal of the vehicle battery and no current flows through resistor 32 as flow is prevented by the diode 33. The combined odometer and speedometer then operates in the manner described earlier. When the driver operates the changeover contact to select the high axle ratio by bringing the moveable contact 112 into engagement with contact 99, the winding 94 is energised and the armature rotates. The motor operates the overdrive to select the higher axle ratio and when this is selected, the switch 96 is closed and the switch 98 is opened. The terminal 114 is connected to the terminal 113 increasing the energy content of the pulse passing through the milliammeter 54 and that passed to the emitter follower 53. The increase in energy content compensates for the change in axle ratio.

We claim:

1. An odometer for a vehicle comprising generator means for generating a train of pulses at a rate proportional to the speed of the vehicle, pulse shaping means to which the pulses are applied and which produce a shaped pulse in response to each applied pulse, the energy of each shaped pulse being similar, frequency dividing means comprising a magnetic core, first and second windings wound on the core, the shaped pulses being applied to the first winding so as to produce an incremental increase, in one direction, of magnetic flux in the core, and sensing means which are connected to the first and second windings, which sense the condition that the magnetic core is saturated with the flux in said one direction and that current is simultaneously passing through the first winding in the sense to increase the flux in said one direction, and which cause a current pulse to flow through the second winding when said condition is sensed, the current pulse being such that the magnetic core is saturated with the flux in the opposite direction to said one direction, and counting means for counting the current pulses and for displaying the count in units of distance.

2. An odometer as claimed in claim 1 wherein the sensing means comprise amplitude responsive means connected to the first winding and connected to cause a current pulse to flow through the second winding when the current flowing through the first winding exceeds a predetermined value.

3. An odometer as claimed in claim 2 wherein the amplitude responsive means comprise a transistor, the second winding being connected in series with the collector of the transistor.

4. An odometer as claimed in claim 1 wherein the pulse shaping means comprise a monostable blocking oscillator comprising a transistor and a transformer having a further magnetic core wound with third and fourth windings, the third winding being connected in the input circuit of the blocking oscillator and the fourth winding being connected in the output circuit of the blocking oscillator, the arrangement being such that in response to each applied pulse, a current passes through the second winding, said further magnetic core being saturated during said current pulse.

5. An odometer as claimed in claim 4 wherein the monostable blocking oscillator includes a further winding to which the pulses generated by the generator means are applied.

6. An odometer as claimed in claim 4 wherein the magnetic core of the frequency dividing means is of the same material as that of said further magnetic core.

7. An odometer as claimed in claim 1 wherein the counting means comprise a stepping motor, a drive circuit for the stepping motor to which the current pulses are applied and a counter driven by the stepping motor.

8. An odometer as claimed in claim 7 wherein the stepping motor comprises first and second stator members each formed of a high permeability magnetic material and provided with a plurality of poles, the stator members being disposed so that the poles interdigitate, first and second windings associated with both the first and the second stator members, a permanently magnetised rotor, and means for ensuring the rotor is confined to a single direction of rotation, the drive circuit being arranged to energise the first and second windings alternately in response to successive current pulses.

9. An odometer as claimed in claim 8 wherein the means for ensuring the rotor is confined to a single direction of rotation comprise means shading some of the poles of the first and second stator members.

10. An odometer as claimed in claim 8 wherein the drive circuit comprises a bistable trigger circuit having first and second stable states, and in which the first and second windings of the stepping motor are connected, the bistable circuit being such that current flows through the first winding of the motor in its first stable state and through the second winding of the motor in its second stable state.

11. An odometer as claimed in claim 1 which comprises control means associated with the pulse shaping means for altering the energy in the shaped pulses.

12. The combination of an odometer as claimed in claim 1 and a current meter to which the shaped pulses are applied and which is calibrated in units of speed.

References Cited

UNITED STATES PATENTS

| | | | |
|---|---|---|---|
| 2,295,118 | 9/1942 | LeClair | 324—70 |
| 2,579,231 | 12/1951 | Goldberg | 310—49 |
| 2,968,796 | 1/1961 | Lane | 328—39.5 |
| 3,007,142 | 10/1961 | Wang | 328—39.5 |
| 3,042,847 | 7/1962 | Welch | 310—49 |
| 3,174,088 | 3/1965 | Muller | 310—49 |
| 3,201,605 | 8/1965 | Lee | 328—39.5 |
| 3,210,658 | 10/1965 | Stevens | 324—70 |
| 3,283,233 | 11/1966 | MacGeorge | 310—49 |

FOREIGN PATENTS

| | | |
|---|---|---|
| 44,254 | 8/1956 | Germany. |
| 961,244 | 6/1964 | Great Britain. |

RUDOLPH V. ROLINEC, *Primary Examiner.*

M. J. LYNCH, *Assistant Examiner.*